Aug. 30, 1966     P. B. SHAFFER     3,270,221
MOTOR VIBRATION SUPPRESSION MOUNTING
Original Filed Dec. 11, 1962     3 Sheets-Sheet 1
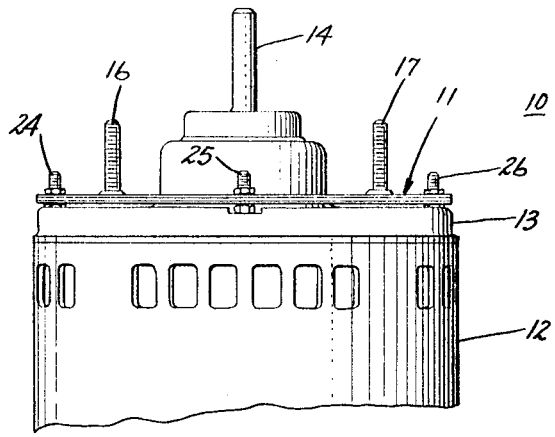
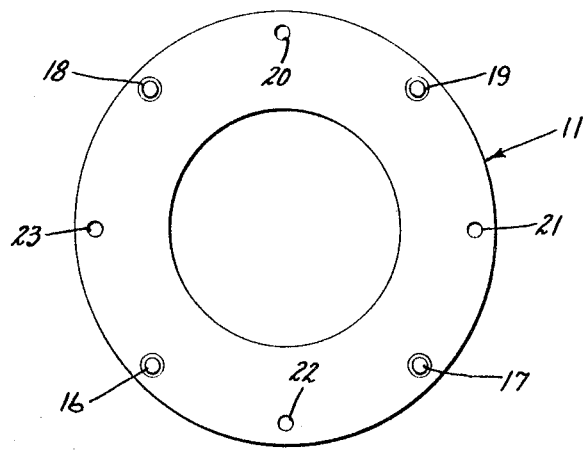
INVENTOR.
Paul B. Shaffer,
by Henry J. Marciniak
Attorney.

Aug. 30, 1966  P. B. SHAFFER  3,270,221
MOTOR VIBRATION SUPPRESSION MOUNTING
Original Filed Dec. 11, 1962  3 Sheets-Sheet 2
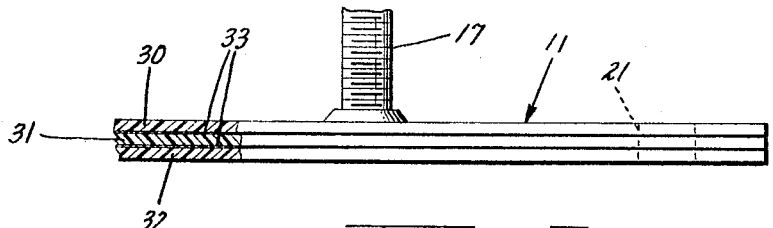
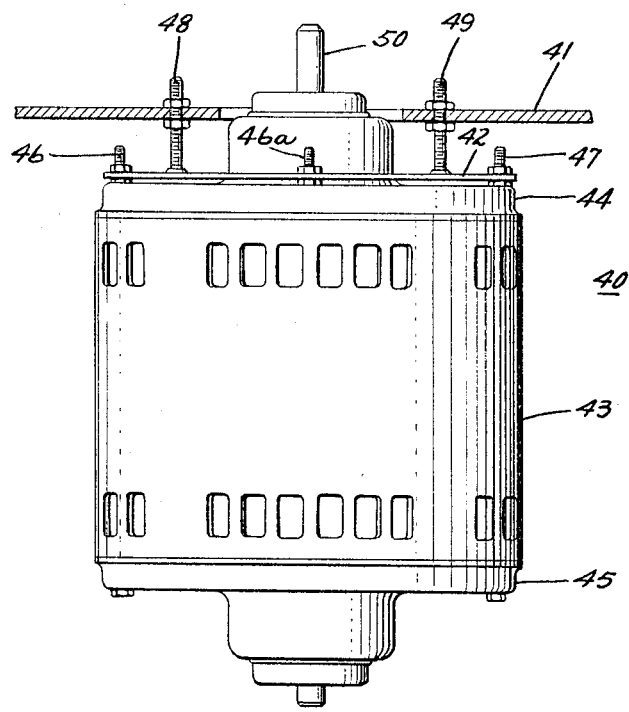
INVENTOR.
Paul B. Shaffer,
by Henry J. ........
Attorney.

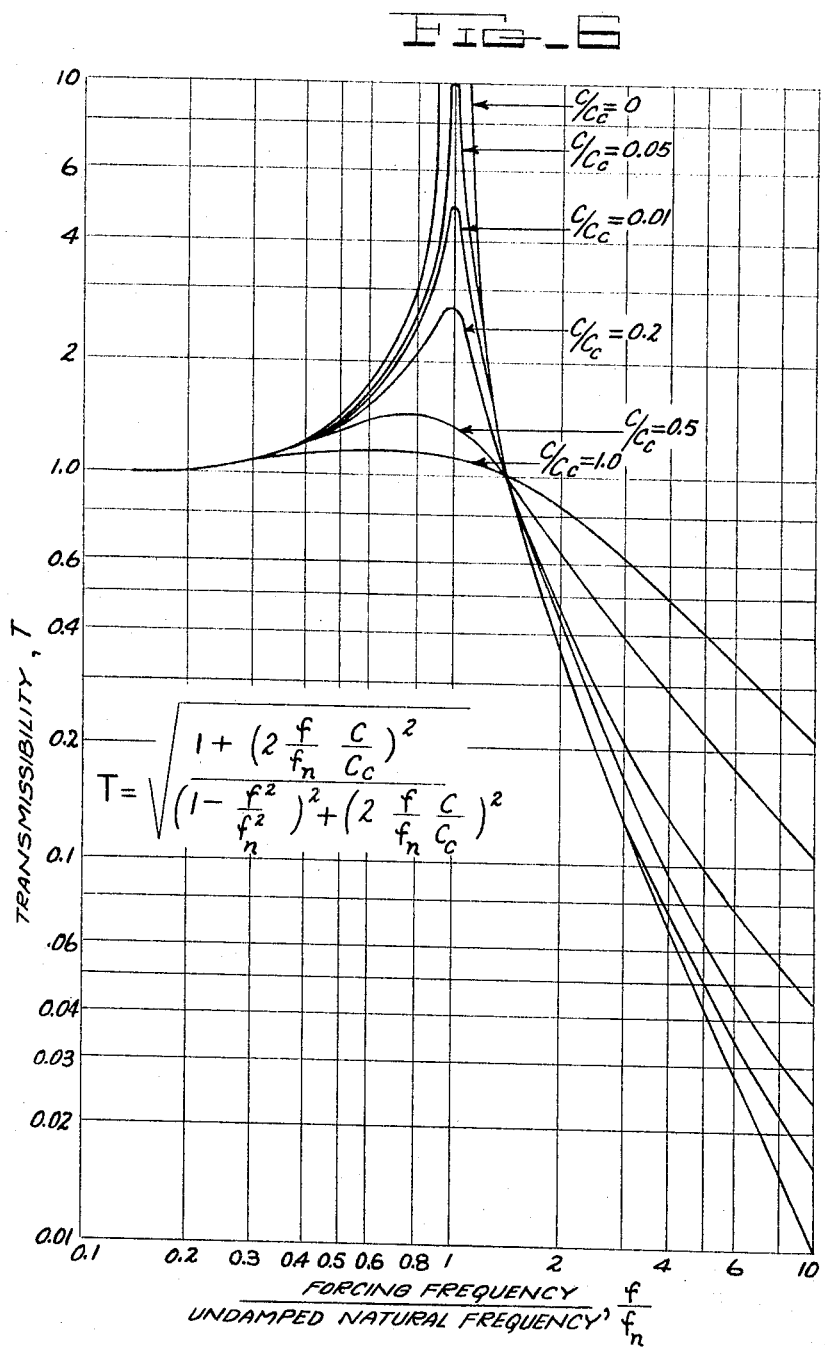

United States Patent Office 3,270,221
Patented August 30, 1966

3,270,221
MOTOR VIBRATION SUPPRESSION MOUNTING
Paul B. Shaffer, 201 Delcy Drive, De Kalb, Ill.
Continuation of application Ser. No. 243,902, Dec. 11, 1962. This application May 28, 1965, Ser. No. 467,162
6 Claims. (Cl. 310—51)

The present application is a continuation of my copending application Serial No. 243,902, now abandoned, filed December 11, 1962. This invention relates to improved motor mounting arrangements and more particularly to such motor mounting arrangements wherein the transmission of axial vibrations to the support or apparatus on which the motor is mounted is minimized.

Axial vibrations caused by operating rotating machines, such as motors, from a cyclically varying power supply, such as a 60 cycle alternating power source, may cause objectionable noise and may unduly excite the support members on which the rotating machine is mounted unless some provision is made to isolate the axial vibrations. The problem of effectively isolating the vibration of the rotating machine becomes critical in applications where the machine is suspended in a vertical position from a main support and particularly where a frictional type of driving connection, such as a belt and pulley, is employed. In such applications, the support in which the rotating machine is mounted by be subjected to axial, torsional and radial forces resulting from the weight and vibratory motion of the rotating machine.

Where a motor is mounted or supported by a housing or frame of the apparatus in which the motor is employed, the virbatory motion of the motor is transmitted to the frame or housing. Thus, the panels or other parts which comprise the frame or housing of the apparatus may vibrate with the motor. Conventionally, resilient cushion rings have been employed to minimize the effect of these vibrations, especially in small dynamoelectric machines, such as fractional horsepower motors. Such conventional resilient mountings utilize an annular cushion ring of resilient material fitted generally at each end of the motor and a base member arranged to support the resilient cushion ring. This type of resilient mounting construction has not proven to be satisfactory in many applications. For example, where the motor must be suspended and supported at only one end, such a resilient mounting arrangement cannot, of course, be used with conventional base designs. It will be appreciated, also, that the cushion ring type of mounting arrangement is not adaptable for use in many motor frame configurations which do not readily permit the use of cushion rings at the ends of the motor. Moreover, the cushion ring type of mounting arrangement is relatively expensive to manufacture.

It is, therefore, desirable to provide a mounting arrangement for a dynamoelectric machine, such as a motor, wherein vibrations produced by the motor are effectively isolated from the support members at the apparatus on which the motor is mounted. It is also desirable that the mounting arrangement be readily adaptable to existing motor installations so that vibration problems when encountered can be corrected without requiring any extensive modifications of the motor or the support members. These advantages should, of course, be achieved economically and with an efficient utilization of materials and labor.

Accordingly, it is an object of the invention to provide an improved mounting arrangement for a dynamoelectric machine, such as a motor, whereby vibrations produced by the motor during operation are effectively isolated from the apparatus on which the motor is mounted.

A more specific object of the invention is to provide an improved mounting arrangement for a motor which is readily adapted for converting motorts installed in an apparatus without any vibration isolating mounting.

It is a further object of the invention to provide an improved motor mounting arrangement that can be economically manufactured and that is relatively inexpensive to produce and to install.

Another object of the invention is to provide an improved motor mounting arrangement for isolating motor vibrations that is particularly adaptable to applications in which the motor is supported at one end in an essentially vertical position.

According to one form of my invention, I have provided an improved arrangement for mounting an electric motor on a support. In the mounting arrangement, a vibration isolating base member is disposed at one end of the motor. A plurality of attaching members are provided for securing the vibration isolating base member to the support. The attaching members divide the vibration isolating member into beam portions which are fixedly supported at each end by the attaching members and provide a deflectable support for the motor. The motor is secured to the vibration isolating member at an intermediate position on each of the beam portions. The beam portions are proportioned so that the ratio of the forcing frequency of the motor to the natural frequency of the vibration isolating member is held within predetermined limits to control the transmissibility of the vibrations produced by the motor to the support or apparatus and which the motor is mounted below a preselected value as will be explained in more detail hereinafter, the proportions of the beam portions for a given motor application may be determined in accordance with the expression:

$$d = \frac{Pl^3}{192EI}$$

where $d$ is the deflection of the individual beam portions in inches; P is the concentrated load of the motor being supported at each beam portion in inches; $l$ is the length of the beam portions in inches; 192 is a numerical unit conversion constant; E is the modulus of elasticity in pounds per square inch for the beam portions; and I is the moment of inertia in inches to the fourth power.

The subject matter which I regard as my invention is particularly pointed out and distinctly claimed in the concluding portion of this specification. My invention, itself, both as to its organization and method of operation, together with further objects and advantages thereof, may be best understood by reference to the following description taken in conjunction with the accompanying drawings in which:

FIGURE 1 is a fragmentary view of an end of a motor incoporating the improved mounting arrangement of the invention;

FIGURE 2 is a plan view of the vibration isolating base member used in the preferred embodiment of the invention illustrated in FIGURE 1;

FIGURE 3 is an end view of the vibrating isolating base member shown in FIGURE 2;

FIGURE 4 is a fragmentary view of the right end of the vibration absorbing base member as shown in FIGURE 3, the view being enlarged to show the details;

FIGURE 5 illustrates an electric motor being suspended from a support member by the improved mounting construction of one form of the present invention; and FIGURE 6 shows a plot of the transmissibility ratio T against the ratio $f/f_n$, the ratio of the forcing frequency to the natural frequency for various values of the damping constant ratio of $C/C_c$ in a single degree of freedom system.

Referring now to the drawings, there is shown in FIG-

URE 1 an electric motor 10 of the type used in a domestic washing machine or other appliances and in FIGURES 2, 3, and 4, a vibration isolating member 11 arranged in accordance with the invention. The electric motor 10 as shown is comprised of the vibration isolating base member 11, a main frame member 12, an end shield assembly 13, and a rotatable rotor shaft 14 extending upwardly through the end shield member 13.

In order to attach the motor 10 to the driven apparatus (not shown), the vibration isolating base member 11 is provided with four equispaced studs 16, 17, 18 and 19. Also, it will be noted that the vibration isolating base member 11 is provided with four equispaced clearance holes 20, 21, 22, 23, and as shown in FIGURE 2, are adapted for receiving the through bolts 24, 25, 26 and a through bolt which is not seen in the view shown. The through bolts hold the end shield assembly 13 in assembled relation with the main frame member 17 of the motor 10. It will be noted that the spacing between the studs 16, 17, 18, and 19 is equal to the spacing of the through bolts. This arrangement results in the advantage that in installations where a motor was attached to the apparatus by means of the through bolts without a vibration isolating means, the vibration isolating member of the invention can be readily installed. It will be appreciated that in such existing installations a vibration problem can be solved without need for modifying the motor 10. Further, it is not required to change the support on which the motor 10 is mounted since the clearance holes on the support which are adapted to receive through bolts can be also used to receive the mounting studs of the vibration isolating member 11. Thus, an important advantage of the arrangement used in the illustrated embodiment of the invention is that noise or vibrations caused by a motor installed in an appliance can be readily minimized without any extensive modifications to either the motor or the apparatus. In order to correct the vibration condition, it is only required to disconnect the motor, install the vibration isolating base member 11 as shown in FIGURE 1 and then to reassemble the motor on the apparatus.

Referring now more particularly to the views of the vibration isolating member 11, as shown in FIGURES 2, 3, and 4 of the drawings, it will be seen that the vibration isolating base member 11 is comprised of a stack of three annular-shaped plates or laminations 30, 31, 32. In the illustrated embodiment of the invention, uncut stator laminations were used for the plates. The annular plates 30, 31, 32 were cemented together by a resilient caulking cement 33, which did not harden but remained relatively plastic or viscous so as to improve the damping characteristics of the vibration isolating base member 11. The studs 16, 17, 18 and 19 were silver soldered to the annular plates. As will be hereinafter more fully explained, the studs 16, 17, 18 and 19 divide the base member 11 into four beam portions and serve as fixed supports for the beam portions. The number of annular plates 30, 31, 32 was used to control the natural frequency of the vibration isolating base member 11. It will be appreciated that other factors, such as the number of beam portions can be varied to provide the desired natural frequency. Further, resilient annular shaped members may be interposed between the annular plates 30, 31, 32 to improve the damping characteristics of the vibration isolating base member 11, if necessary.

In FIGURE 5, I have illustrated a motor 40 that is vertically suspended on a support member 41 by a mounting arrangement in accordance with the invention. In this exemplification of the invention, a vibration isolating base member 42 comprised of a single annular plate is utilized to effectively minimize the motor vibrations transmitted to the support member 41.

The motor 40 is substantially enclosed in a housing which includes frame member 43 and a pair of end shield members 44, 45, the end shield members 44, 45 being secured by four through bolts only three of which 46, 46a, 47 are seen in FIGURE 5. The through bolts hold the vibration isolating base member 42 in assembled relation with the motor 40. Four studs, only two of which 48, 49 are seen in the view shown, are used to secure the vibration isolating base member 42 to the frame member 41. a shaft 50 is rotatably mounted in bearing assemblies supported in the end shield members 44, 45.

In carrying out the present invention in practice, the vibration isolating member is proportioned so that the ratio of the forcing frequency $f$ to the natural frequency $f_n$ is held within predetermined limits so that the transmissibility of vibrations produced by the motor are effectively minimized. For a vibration isolating base member 11 having four equispaced studs 16, 17, 18 and 19, the portions of the member 11 between the studs may be considered as simple fixed beams with a concentrated load being applied at the center of the beam. The natural frequency $f_n$ of the vibration isolating member 11 is dependent upon a deflection of these individual beams and is equal to $3.13/d$, where $f_n$ is the natural frequency of the system in cycles per second, and $d$ is the deflection of the vibration isolating member in inches.

The motor 11 used in the exemplification of the invention was a four pole motor operating at 1,725 revolutions per minute and was energized from a 60 cycle power supply. The maximum forcing frequency occurred at 120 cycles per second and a second forcing frequency occurred once per revolution or at a frequency of 28.75 cycles per second. It will be appreciated that if the vibration isolating base member 11 had a natural frequency near any one of these two forcing frequencies, in the absence of a very high damping factor, these forcing frequencies would be multiplied. Accordingly, a suitable value for the natural frequency of the vibration isolating member 11 was selected whereby the transmissibility of the motor vibrations was effectively minimized as will now be more fully explained.

For the purpose of determining the transmissibility of the motor vibrations to a support, the motor 10 and the vibration isolating base member 11 were assumed to be a single degree of freedom system. In FIGURE 6, I have illustrated a series of curves representing a plot of transmissibility T versus the ratio $f/f_n$ for various values of the damping ratio $C/C_c$, where C is the damping factor of the vibration isolating member 11 and $C_c$ is the critical damping factor. For the vibration isolating member 11 employing three stator laminations bonded with a relatively soft or pliable bonding cement, it was found that the damping ratio was approximately 0.2. The transmissibility T is the ratio of the displacement amplitude of the motor 40 to that of the base member 11 and is a function of the frequency ratio $f/f_n$ and the damping ratio $C/C_c$ as is set forth in FIGURE 6.

If we take 40 cycles per second as a predetermined value for the undamped natural frequency of the base member 11, it will be seen that the curve corresponding to a damping ratio of 0.2 for a frequency ratio $f/f_n$ of 120/40 or 3, the transmissibility T is approximately 0.20. For the 28.75 cycle excitation, the frequency ratio $f/f_n$ is approximately 0.72, and from the curve in FIGURE 6 corresponding to a damping ratio of 0.2, we obtain a value of 1.8 for the transmissibility T. Thus, the two values for the transmissibility T appear to be satisfactory.

The vibration isolating member 11 used in the exemplification of the invention was proportioned to provide a natural frequency of 40 cycles per second by varying its thickness. The deflection due to gravity of a beam portion of the member 11 in inches corresponding to a natural frequency of 40 cycles per second is equal to the square of 3.13/40 or .00614.

If we assume that the beam portion of the vibration isolating member 11 is a simple fixed beam with a concentrated load at the center, the thickness of a single lamination of member 11 can be determined from the following expression for the deflection $d$ of a fixed beam:

$$d = \frac{Pl^3}{192EI}$$

where P is ¼ of the weight of the motor 10 divided by the number of plates or 1 pound; $l$ is the length of the beam of 4 inches; E is the modulus of elasticity in pounds per square inch which for steel is $30 \times 10^6$; and I is the moment of inertia or ½ the width (1.4 inches) of the beam portion times $h^3$, $h$ being the thickness in inches.

For the specific illustrative example in the value of thickness $h$ was found to be approximately .0249 inch. The vibration isolating member 11 was constructed of three laminations having a thickness of .025 inch to provide a member having a natural frequency of 40 cycles per second.

From the foregoing description of the preferred embodiment and of the specific example presented by way of a particular exemplification thereof, it will be apparent that the transmissibility of the motor vibrations to the support can be controlled by proportioning the beam portions to provide a vibration isolating member having the desired natural frequency. It will be apparent that other dimensions of the beam portion may be varied. For example, the number of the beam portions can be varied so as to change the effective beam length. Further, it will be appreciated that although a vibration isolating base member having an annular shape was employed, other configurations can be used in carrying out the present invention.

It should be apparent to those skilled in the art, that while I have shown what presently is considered to be a preferred embodiment of my invention that changes and modifications can be made without actually departing from the true spirit and scope of the invention. It is, therefore, intended to cover in the appended claims all such equivalent variations as fall within the invention.

What I claim as new and desired to secure by Letters Patent of the United States is:

1. In an arrangement for mounting an electric motor on an apparatus, an electric motor, a vibration isolating base member, and motor vibration transmissibility controlling means for holding a ratio of forcing frequency $f$ of the motor to natural frequency $f_n$ of the vibration isolating member within predetermined limits to control transmissibility of vibrations produced by the motor to the apparatus below a preselected value, said transmissibility controlling means comprising an attaching means adapted for securing said vibration isolating base member to the apparatus, said attaching means dividing said vibration isolating base member into a preselected plurality of deflectable beam portion means, said attaching means being adapted for providing a fixed support at each end for said deflectable beam portion means, securing means for attaching said motor at an intermediate position on each of said deflectable beam portion means to provide a deflectable support for said motor, said deflectable beam portion means having predetermined proportions for holding the ratio of the forcing frequency of the motor to the natural frequency of the vibration isolating member within said predetermined limits, said predetermined proportions of the beam portion means being determined in accordance with the expression $$d = \frac{Pl^3}{192EI}$$

where $d$ is the deflection of the beam portion means in inches,
$P$ is the concentrated load of the motor being supported in pounds,
$l$ is the length of the beam portion means in inches,
192 is a numerical constant,
E is the modulus of elasticity in pounds per square inch for the beam portion means, and
I is the moment of inertia in inches to the fourth power, whereby the transmissibility of the vibrations produced by the motor to the apparatus is effectively controlled.

2. In a motor mounting arrangement for mounting an electric motor on a support, a vibration isolating base member formed of at least one generally annular-shaped plate means, an electric motor having a housing supporting the stator and rotor for relative rotation, and motor vibration transmissibility controlling means for holding the ratio of forcing frequency $f$ of the motor to natural frequency $f_n$ of the vibration isolating member within predetermined limits to control transmissibility of vibrations produced by the motor to the support below a preselected value, said vibration transmissibility controlling means comprising attaching means for fixedly attaching said vibration isolating base member to a support, said attaching means dividing said member into deflectable beam portion means adapted to be supported at the ends thereof, securing means fixedly securing said motor at a position intermediate of the ends of each of said deflectable beam portion means, said deflectable beam portion means defining a deflectable support for said motor and having predetermined proportions for holding the ratio of the forcing frequency of the motor to the natural frequency of the vibrations isolating member within said predetermined limits, said predetermined proportions of the beam portion means being determined in accordance with the expression $$d = \frac{Pl^3}{192EI}$$

where $d$ is the deflection of the beam portion means in inches;
$P$ is the concentrated load of the motor being supported in pounds,
$l$ is the length of the beam portion means in inches,
192 is a numerical constant,
E is the modulus of elasticity in pounds per square inch for the beam portion means, and
I is the moment of inertia in inches to the fourth power.

whereby the transmissibility of the motor vibrations to the support for the motor is effectively controlled.

3. In an arrangement for mounting a motor on a support, an electric motor having a housing substantially enclosing the stator and rotor, a vibration isolating base member disposed at one end of said motor, said vibration isolating base member being comprised of a stack of flat deflectable plates, a resilient means interposed between said plates to provide the desired damping characteristics in said vibration isolating base member, a plurality of attaching members adapted for attaching the vibration isolating base member to a support, said attaching members dividing the vibration isolating base member into a plurality of beam portions to provide a fixed support for said beam portions at the ends thereof, means for attaching said vibration isolating base member in fixed relation with the housing of the motor at intermediate points between the ends of each of said beam portions, said beam portions providing a deflectable support for said motor and being proportioned so that the ratio of the forcing frequency of the motor to the natural frequency of the vibration isolating base member is maintained withing predetermined limits to minimize the transmissibility of vibrations to the support for the motor.

4. In an arrangement for mounting an electric motor in a support with the rotatable shaft of the motor disposed in a vertical position, a vibration isolating base member comprised of a stack of at least two deflectable laminations having resilient means interposed therebetween, a plurality of generally equispaced attaching members fixedly attached to said vibration isolating member, said attaching members being adapted for securing said vibration isolating base member into a plurality of deflectable beam portions, and means attaching said motor to said vibration isolation member at an intermediate location on each of said deflectable beam portions, said deflectable beam portions, providing a deflectable support for said motor to minimize the transmission of the motor vibrations to the support.

5. In a motor mounting arrangement for supporting an electric motor, a vibration isolating base member disposed at one end of said motor, said vibration isolating base member being comprised of a stack of annular-shaped plates, said plates being laminated with a resilient cement, a plurality of axially extending studs mounted in equispaced locations on said vibration isolating base member, said studs being adapted for securing said vibration isolating base member to a support and dividing said vibration isolating base member into a plurality of beam portions, said stubs being adapted to provide a fixed support at the ends thereof, and, means attaching each of said beam portions at an intermediate point thereon in force transmitting relation with said motor, said vibration isolating member being proportioned so that the ratio of the forcing frequency of the motor vibrations to the natural frequency of the vibration isolating base member is maintained within predetermined limits in order to minimize the transmission of the motor vibrations to the support.

6. In a motor mounting arrangement for suspending an electric motor in a vertical position from a support; an electric motor having an upper end shield member assembled to a main frame member by means of a plurality of equispaced through-bolts; vibration isolating base means comprised of at least two relatively thin plates having resilient means interposed therebetween; said vibration isolating base means being fixedly attached to said upper end shield member and in spaced relationship therewith by said through-bolts; and a plurality of equispaced attaching members fixedly attached to said vibration isolating base means at intermediate locations between said through-bolts and dividing said vibration isolating base means into a plurality of deflectable beam portions; said vibration isolating base means having predetermined proportions for holding the ratio of the forcing frequency of the motor vibrations to the natural frequency of the vibration isolating member means within predetermined limits to minimize the transmission of the motor vibrations to the support.

References Cited by the Examiner
UNITED STATES PATENTS 2,188,807 1/1940 Castricone ---------- 310—51
2,481,494 9/1949 Bonthron ---------- 310—51

MAX L. LEVY, *Primary Examiner.*

ORIS L. RADER, MILTON O. HIRSHFIELD,
*Examiners.*

J. W. GIBBS, *Assistant Examiner.*